INVENTOR.
Carl B. Jones

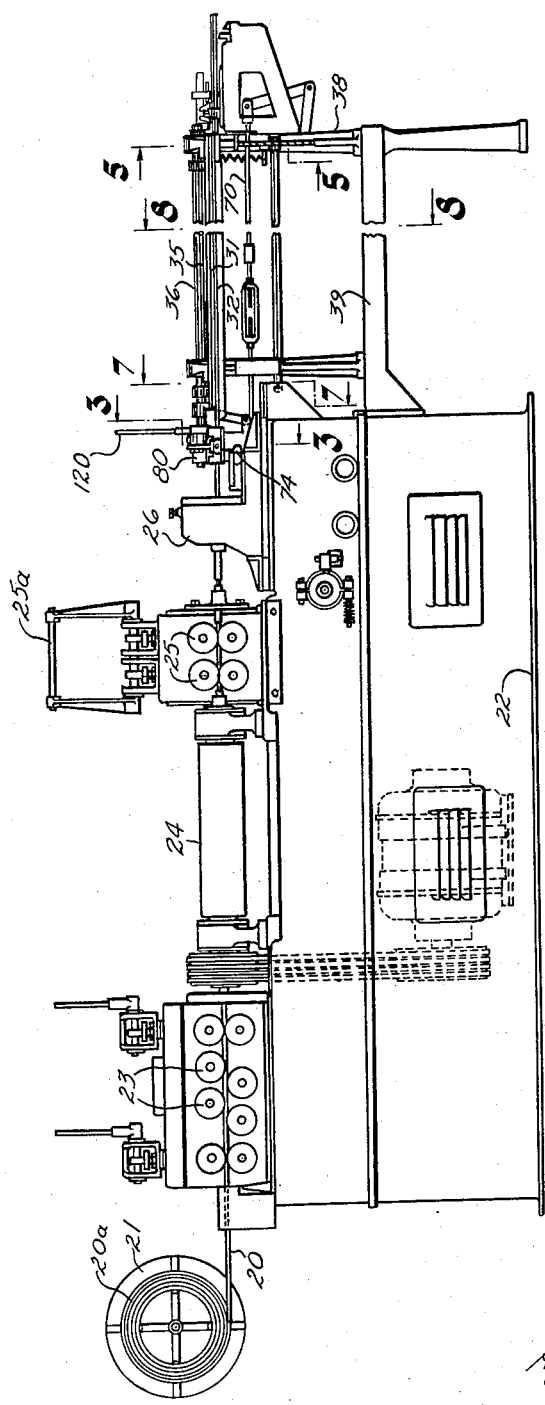

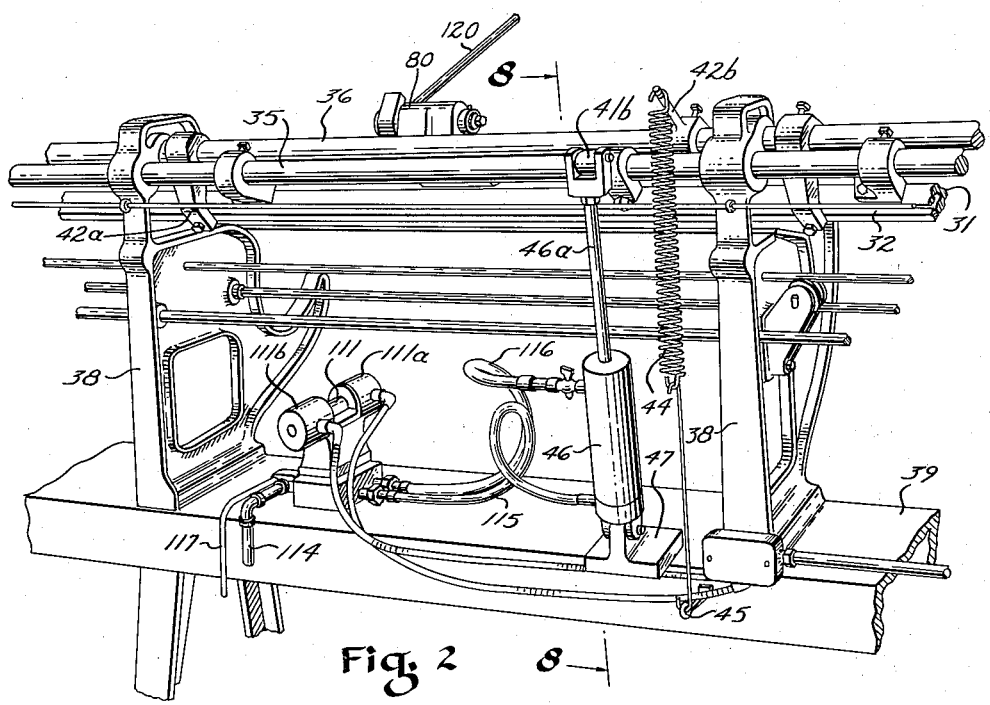
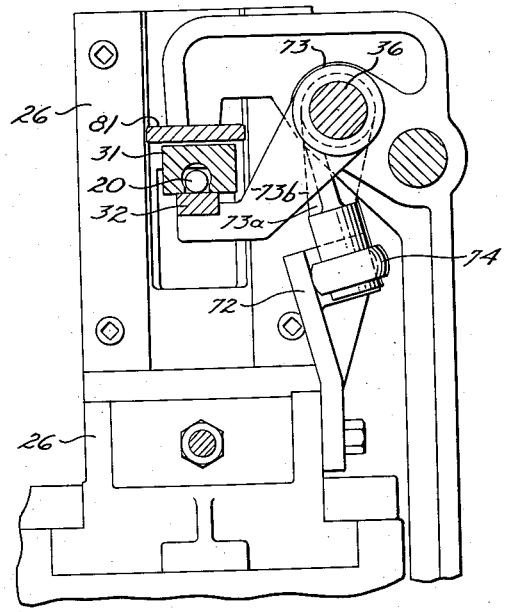

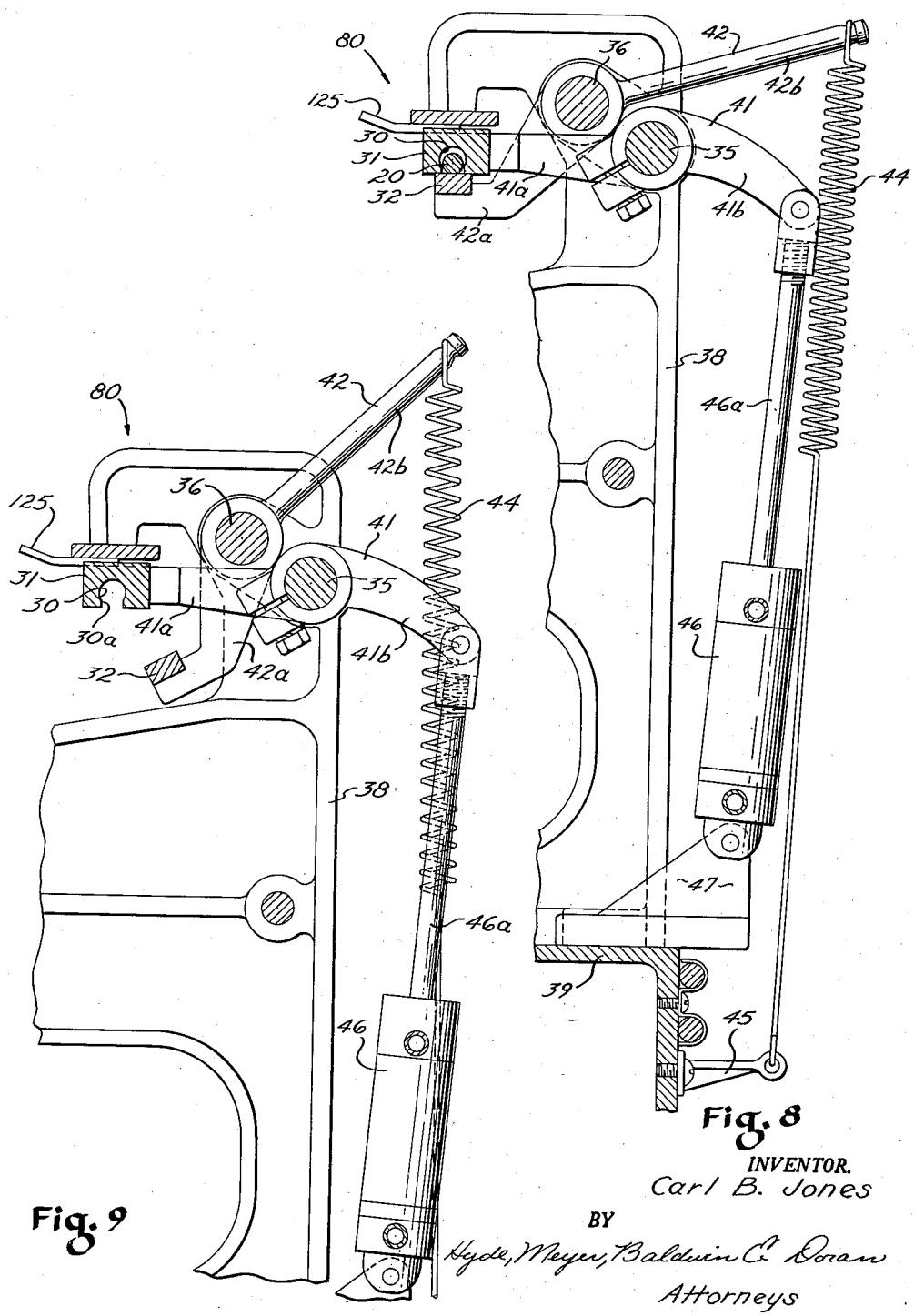

INVENTOR.
Carl B. Jones

United States Patent Office 2,969,093
Patented Jan. 24, 1961

2,969,093

FLUID PRESSURE OPERATED ROD GUIDE FOR USE WITH PULL-OUT DEVICE

Carl B. Jones, Cleveland Heights, Ohio, assignor, by mesne assignments, to Curtis Manufacturing Company, a corporation of Missouri Filed Nov. 18, 1955, Ser. No. 547,626

5 Claims. (Cl. 140—140)

This invention relates to improvements in a machine having guide elements and a pull-out device and more particularly to such a machine for straightening and cutting lengths of wire or rod and having power operated rod guide elements.

One of the objects of the present invention is to provide a straighten-and-cut machine having means for cutting the wire or rod into pieces of predetermined length and having improved means for facilitating the straightening of the last length of a heavy wire or rod straightened from a reel of the same.

A further object of the present invention is to provide, in a straighten-and-cut machine, guide means for normally holding the wire or rod in proper position for gaging and cutting and means for moving any interfering portion of the guide means out of the way while a pull-out device is operating.

A further object of the present invention is to provide rod guide means including a pair of coacting guide elements to form a rod receiving channel in closed position for normal cut-off, having only a lighter one of these elements swingable away from this closed position to a rod discharge position, and having both of these elements swingable away from the closed position to a clearance position to permit the pull-out device to operate, whereby the inertia of element movement is minimized during movement to the discharge position and whereby the rod discharge clearance between the elements is maximized in the discharge position.

A further object of the present invention is to provide a straighten-and-cut machine wherein during pull-out operation the rod guide elements are swung to the clearance position independently of the travel movement of a vise clamped to and carried forwardly by the moving rod.

A further object of the present invention is to provide a straighten-and-cut machine characterized by its structural simplicity, high speed operating characteristics, and desirable operating characteristics.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view of a machine embodying the present invention with that portion of the machine where the pull-out device operates greatly contracted to simplify the drawings;

Fig. 2 is a fragmental perspective view, taken from the other side of the machine in Fig. 1, of a portion of the machine in the pull-out zone which was omitted in Fig. 1;

Fig. 3 is a transverse sectional view taken along the line 3—3 of Fig. 1 of a vise in its open position;

Fig. 4 is a view similar to Fig. 3 with the vise in its closed position;

Fig. 7 is a transverse sectional view taken along the line 7—7 in Fig. 1, with the vise omitted for clarity, of the cam and follower mechanism for moving the lower guide element to its discharge position;

Figure 10:
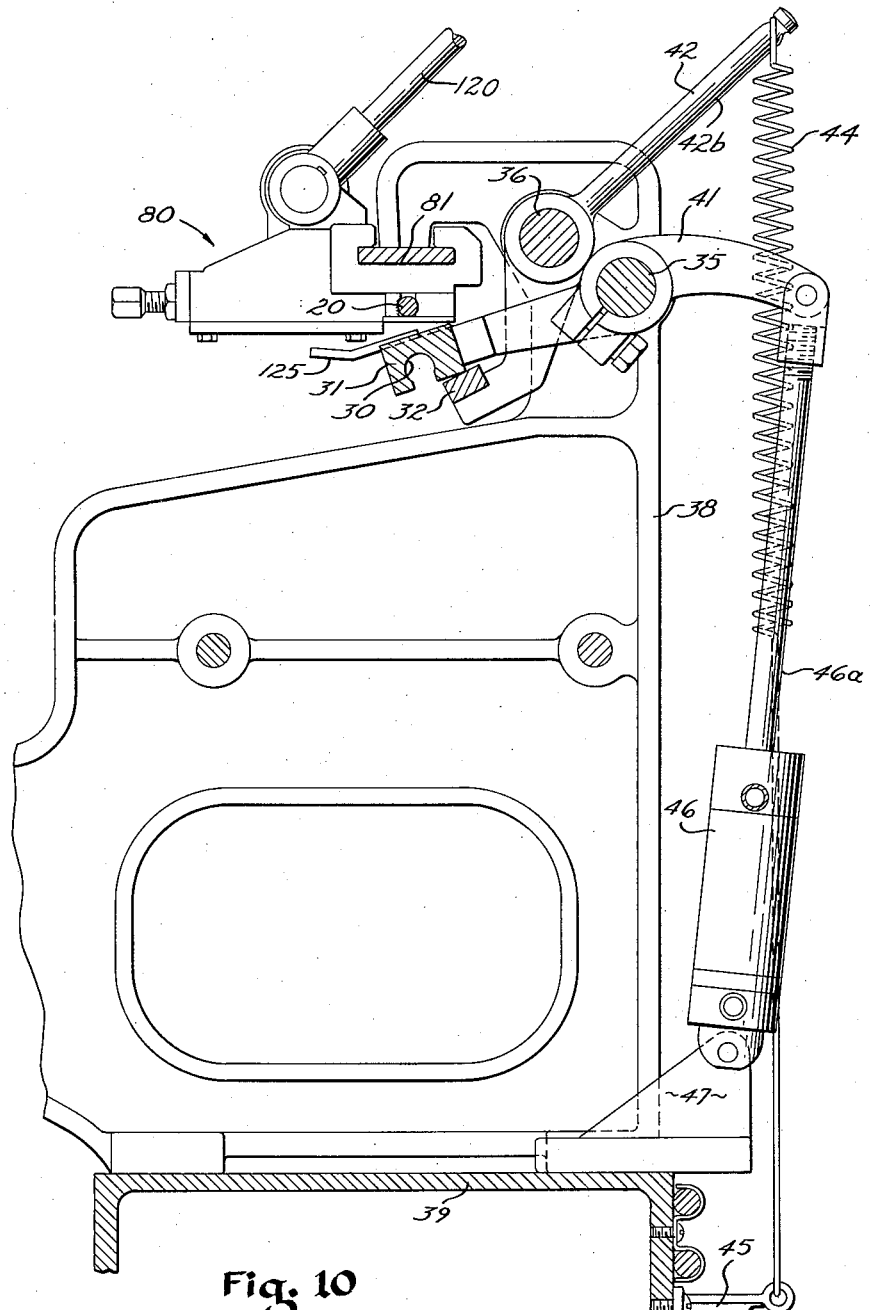
Figure 11:
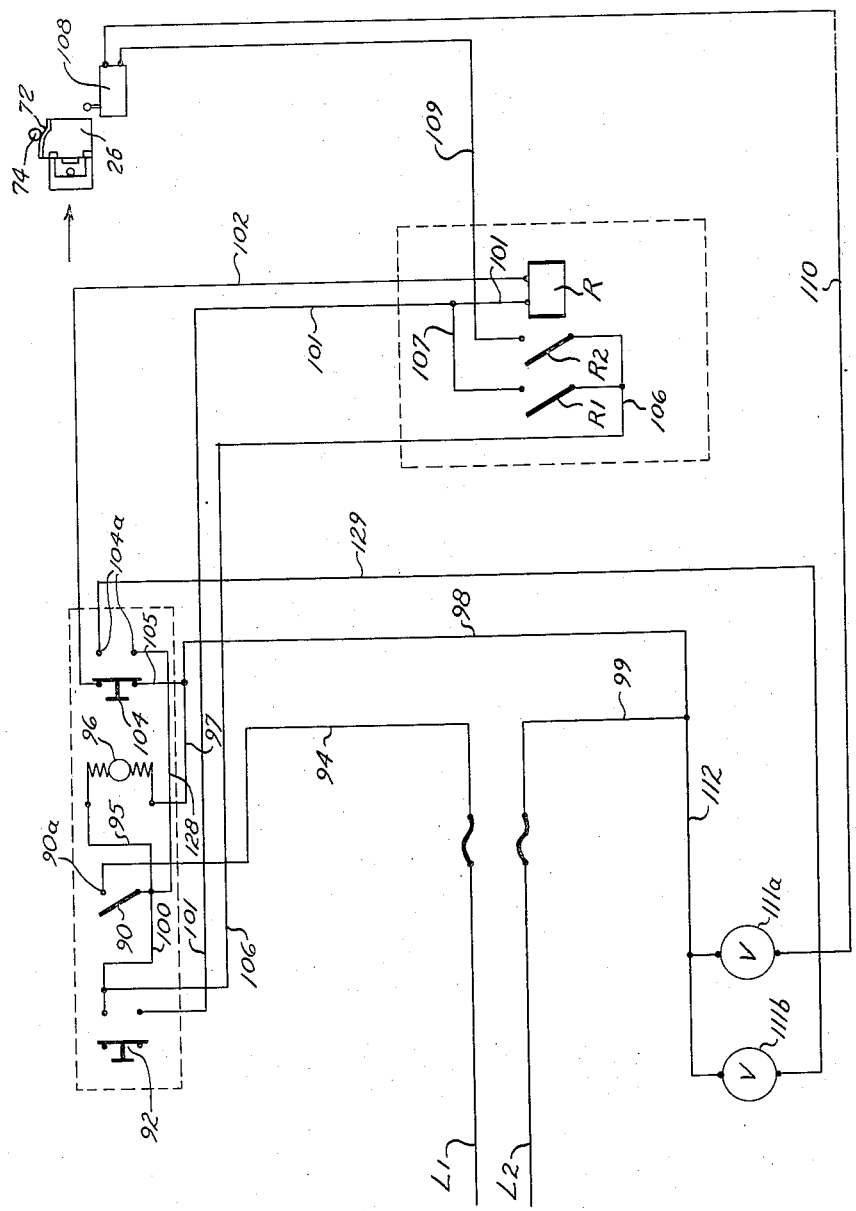

Fig. 8 is a transverse sectional view taken along the line 8—8 of Figs. 1 and 2 with the guide elements in their closed position and with the vise of Figs. 3 and 4 eliminated for clarity;

Fig. 9 is a transverse sectional view similar to Fig. 8 but with the lower guide element swung downwardly to the discharge position;

Fig. 10 is a transverse sectional view similar to Fig. 8 but with the vise included and both guide elements swung downwardly to the clearance position; while Fig. 11 is an electrical circuit for moving the elements from the Fig. 8 to the Fig. 10 positions.

While this invention might be adapted to various types of machines, the device is herein disclosed and claimed as an improvement on the wire cutting machine shown in U.S. Patent No. 2,101,860 granted December 14, 1937 to Marvin W. Lewis and Carl B. Jones and in U.S. Patent No. 2,444,518 granted July 6, 1948 to Marvin W. Lewis to which patents reference may be had for details not described in the present application.

Fig. 1 of the drawings discloses that this machine is similar to the machines in the aforementioned prior patents since a long length of wire or rod 20 in coil form 20a is supported on a reel 21 suitably rotatably supported on machine frame 22. The free end of this rod is fed toward the right through a set of straightening rolls 23, through a rotatable straightening arbor 24 (which crimps the wire or rod back and forth while rotating about it), and through a final set of feed rolls 25, with rolls 23 and 25 as well as arbor 24 rotatably supported on frame 22, to a zone of the machine at the right-hand end thereof, as viewed in Fig. 1, wherein a length of rod is run out and cut to length. In this zone, the rod passes through a shear head 26, movable back and forth along the length of rod movement and in all respects like the shear head 21 of U.S. Patent No. 2,101,860. This shear head also carried a vertically reciprocable cut-off blade for cutting the rod 20 in the same manner. After the rod 20 passes through the shear head 26, the machine has two modes of operation: (1) normal operation wherein the rod is cut off to gaged lengths, and (2) pull-out operation immediately prior to the time the end of the rod 20 leaves the coil form 20a and also after rod 20 leaves coil form 20a.

In normal operation, the rod 20 passes through a rod receiving channel 30, in Fig. 8, for support as a length thereof is run out in the zone to be gaged and cut. A pair of guide elements 31 and 32, located at the right end in Fig. 1, form this rod receiving channel 30. Channel 30 is generally cylindrical in cross sectional form but is cut along a chord thereof to provide an open side 30a in Fig. 9 between the elements sufficiently large to permit rod ejection therethrough when the elements are separated, such as by moving at least one element thereof to a discharge position shown in Fig. 9. These elements 31 and 32 are conventionally called the rod guide bar and clapper bar respectively and perform similar functions to those disclosed in the earlier patents.

The guide elements 31 and 32 are suitably supported on the frame and adapted to be moved between the closed or rod guide position in Fig. 8, the discharge position in Fig. 9, and the clearance position in Fig. 10 with the latter position permitting vise travel in the zone. Here, two laterally spaced apart parallel shafts 35 and 36 are mounted for oscillation in a plurality of vertical frame brackets 38 rigidly connected to the main machine frame 22 by horizontal member 39. Since the guide elements 31 and 32 have considerable length in this type of machine, on the order of ten to sixteen feet for the cutting of longer lengths of rod, it is necessary to provide a number of supporting brackets, spaced for example approximately 30 inches apart on the horizontal member 39, to provide adequate support. The shafts 35 and 36 respectively have at least one bell crank 41 and a plurality of bell cranks 42 secured thereto along the length thereof. Bell crank 41 in Fig. 8 has an arm 41a rigidly connecting element 31 to shaft 35 while bell crank 42 has an arm 42a rigidly connecting element 32 to shaft 36.

Elements 31 and 32 are normally kept in the closed position of Fig. 8 and are permitted to have relative movement on the frame for movement to either the Fig. 9 or Fig. 10 position. Here, a helical spring 44, connected at opposite ends to the distal end of bell crank arm 42b and the bracket 45 secured to horizontal frame member 39, serves as a resilient means to urge element 32 in a clockwise direction in Figs. 8 to 10 to channel closed position with respect to element 31. Also, a fluid pressure operated cylinder and piston unit 46 is pivotally connected at opposite ends to the distal end of arm 41b of bell crank 41 and to a bracket 47 secured to horizontal frame member 39 for normally retaining element 31 in the Fig. 8 and 9 positions.

Figure 6:
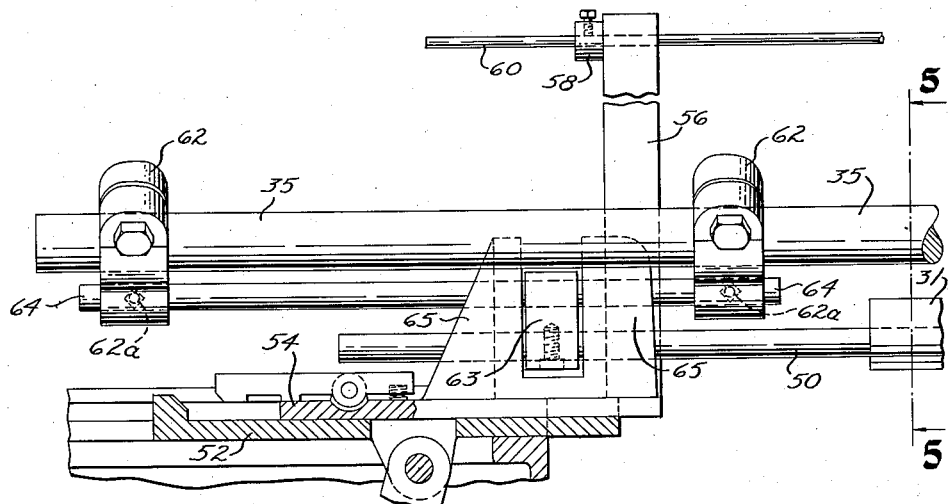
Fig. 6 is a side elevational view of the stock stop end taken from the opposite side of the machine from Fig. 1 and from the left side looking toward the right in Fig. 5.
Figure 5:
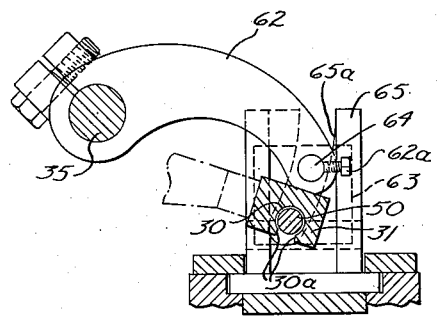
Fig. 5 is a transverse sectional view through the stock stop end of the machine taken along the line 5—5 of Figs. 1 and 6 with only the upper guide element shown and with it swung to the Fig. 10 position.

The stock stop and gaging action is described in detail in U.S. Patent No. 2,101,860 with a portion of the structure also found in the present device in Figs. 5 and 6. The mode of operation here is basically the same as found in said patent and the structure corresponds except for a slight variation. It should be noted that Fig. 6 in the present application corresponds roughly with the upper right hand portion of Fig. 7 in the patent. It should be noted that the gage bar 50, locking slide 52, gage slide 54, bracket portion 56 secured to slide 54, collar 58 and control rod 60 correspond respectively with the corresponding parts 84, 88, 86, 100, 101, and 102 in said patent and operate in an identical manner. However, the clamping member 85 and cap screws 87 from said patent are replaced by the new connecting structure between gage bar 50 and gage slide 54 shown in Fig. 6 of the present application. In Figs. 5 and 6 of the present application, two parallel arms 62 are secured to shaft 35 and have secured to their distal ends a connecting rod 64 by set screws 62a. A block 63 with gage bar 50 clamped thereto is slidable axially on rod 64. Hence, gage bar 50 will move along an arc of constant radius about the center line of shaft 35. Block straddling arms 65, 65 are carried by gage slide 54 and have aligned, arcuate, parallel slots 65a in these arms to provide clearance for both connecting rod 64 and gage bar 50 so that swing about the axis of shaft 35 will be possible while the two straddling arms 65 cause the block 63 to move with the gage slide 54. This construction becomes important when the gage bar 50 extends into the rod receiving channel 30 and element 31 swings from the Fig. 8 to Fig. 10 position, the latter also being shown in Fig. 5. Then, the bar 50, larger in cross sectional diameter than rod 20, swings with the element 31 since it is held within the channel 30 by the lips of the open side 30a, spaced apart less than the diameter of the bore forming channel 30.

The gaging and cut-off action is basically the same as in the prior patents. When the rod 20 engages the gage bar 50, slides 52 and 54, shear head 26 and connecting link 70 in Fig. 1, which link 70 connects shear head 26 and slide 52, coact together in the same manner so that the rod 20 is cut while still moving at its regular speed.

After cut-off, the rod cut to length is dumped from the machine in basically the same manner as disclosed in the earlier of the prior patents with the structure to perform the dumping most clearly shown in Fig. 5 of U.S. Patent No. 2,101,860, although in this prior patent the rod guide bar always remains in fixed position. In Fig. 7 of the present disclosure, similar structure is provided. A cam 72 carried by cut-off head 26 is adapted to coact with a follower provided by a roller 74 rotatably mounted on the distal end of a bell crank arm 73a of bell crank 73. Bell crank 73 is secured to shaft 36 while the distal end of its other arm 73b is secured to the element 32. As the cut-off head 26 moves toward the right in Fig. 1 and after bar cut-off action by its reciprocable blade has taken place, cam 72 engages the roller 74 to turn shaft 36 and clapper bar element 32 counter-clockwise in Fig. 7 about the shaft axis in the direction opposite to the urging action of spring 44 so as to move the lighter element 32 to the discharge position shown in Fig. 9. It should be noted that the heavier upper guide bar element 31 does not move, during this normal operation, but is retained in its Fig. 8 position so that inertia of element movement is minimized and the retarding action on the movement of cut-off slide 26 is also minimized. This permits faster cut-off cycle and permits proper synchronization of cut-off head 26 with high through speed of rod 20. Also maximum clearance is provided between elements 31 and 32 for rod ejection through the open side 30a and rod ejection can take place by gravity after full travel of element 32. These features are important distinctions over U.S. Patent No. 2,444,518. In Figs. 6 and 7 of U.S. Patent No. 2,444,518, after each length is cut both elements must be swung from the closed position in Fig. 6 to the discharge position in Fig. 7 so that inertia of the moving elements and drag on the cut-off slide is greater. Also, it has been found that when the guide elements approach the discharge position in Fig. 7 of U.S. Patent No. 2,444,518, the upper lip of element 27 sometimes interferes with the proper gravity discharge of the cut rod and the rod can only be ejected, if at all, when the elements are at the lower end of their travel, so that upon return movement to the Fig. 6 position in said patent, the lip pinches the partially discharged stock and it may be very rapidly ejected as a dangerous missile. The present structure eliminates these disadvantages in this prior art patent.

During pull-out operation, a different mode of operation is followed. When the end of the coil 20a is reached so that the rod 20 runs free of the reel 21 shown in the U.S. Patent No. 2,101,860, there is nothing to prevent the bending and whipping of this last piece of wire or rod because reel 21 no longer secures rod 20 against rotation. This bending and whipping is caused by the straightening device, and more particularly the rotating arbor 24. As a result of this action, the last length of rod becomes snarled and has no commercial value unless it is secured against rotation. Loss of a length of 10 or 16 feet from each coil of ¼ inch to ¾ inch rod due to this cause is of serious commercial importance. The present invention does away with this loss in a manner similar to that disclosed in U.S. Patent No. 2,444,518.

Here, a vise, generally indicated at 80 in Figs. 3, 4 and 10, is mounted for sliding movement lengthwise in the machine just above the rod 20. The mounting means comprises a rectangularly shaped way 81 in Figs. 3, 7 and 10 supported from above by the same brackets 38. The vise is formed with a C-shape portion 82 in Fig. 3 which embraces the way 81 so as to slidably mount the vise 80 on way 81. This embracing portion 82 makes it impossible for the vise 80 to oscillate or rotate in a plane extending transversely of the rod 20.

However, the elements 31 and 32 must be swung to the clearance position of Fig. 10 to permit travel of the vise with the rod 20 before the rod end leaves the reel 21. Actuating means is provided for swinging at least guide element 31 down to the clearance position in Fig. 10 in the counterclockwise direction about the axis of shaft 35 out of interference with the path of vise travel to permit the vise to travel in the zone with the rod 20. This actuating means and the control means therefor are shown in the perspective view of Fig. 2, by the fluid pressure actuated cylinder and other coacting structure in Figs. 8, 9 and 10, and in the electrical diagram in Fig. 11.

The electrical circuit in Fig. 11 receives its power through power lines L1 and L2. The circuit is placed in a ready position by swinging the switch blade 90 of an on-off switch from the "off" position shown in Fig. 11 to an "on" position in contact with terminal 90a; this is a throw switch that will stay in either position. Then, the circuit and machine are ready for fluid actuated pull-out operation.

When the push button 92 is pressed toward the right, a circuit is set up for moving the elements to the clearance position shown in Fig. 10 after bar cut-off by head 26 has been completed. This push button 92 is pressed when it is known that the following rod length will be the end of coil 20a leaving reel 21 and is pressed before the rod length then in channel 30 has been cut to length. Pressing button 92 closes an energizing circuit for relay coil R. Then, a circuit is formed from power line L1 through line 94, switch contact 90a, and switch member 90 which returns to power line L2 through two different branches. One branch goes from switch member 90 through line 95, resistance type signal light 96, and line 97 to a common return line to power line L2 through lines 98 and 99. The other branch is formed from switch member 90 through line 100, closed switch 92, line 101, relay coil R, line 102, normally closed switch 104, line 105, and the common return line to power line L2.

This forms a holding circuit to keep the relay coil R energized after button 92 is released. This circuit is formed from power line L1 through line 94, switch contact 90a, switch member 90, line 100, line 106, relay contact R1 (now closed), line 107, line 101, relay coil R, line 102, normally closed switch 104, line 105, line 98, and line 99 back to power line L2.

As the cut-off head 26 moves toward the right to perform the cut-off operation before the end of the coil 20a is released from the reel 21, this head performs operations in this sequence: head starts travel toward right in Fig. 1, the bar is cut off, cam 72 in Fig. 7 swings element 32 down to the Fig. 9 position, microswitch 108 in Fig. 11 secured to the machine frame is closed by cut-off head 26 as it moves therepast so as to swing element 31 counterclockwise downwardly to the clearance position of Fig. 10, and head 26 completes its stroke toward the right. Closing microswitch 108 establishes a circuit from power line L1 through line 94, switch contact 90a, switch member 90, line 100, line 106, relay contact R2 (now closed), line 109, microswitch 108 (now closed), line 110, solenoid 111a for operating fluid control valve 111 in Fig. 2, line 112, and line 99 to power line L2. Valve 111 in Fig. 2 is any suitable type flow reversing inlet and exhaust valve, such as one with a single valve stem moved endwise in opposite directions by solenoids 111a and 111b secured to the valve body. Actuation of valve 111 by energization of the solenoid 111a permits fluid under pressure, such as air, water, oil, etc., to flow from a source through conduit 114 in Fig. 2, through valve 111, conduit 115 to the lower end of cylinder and piston unit 46 for raising the piston head and piston rod 46a while the opposite end of the cylinder exhausts through conduit 116, valve 111 and exhaust conduit 117. Raising piston rod 46a will swing bell crank 41 and shaft 45 counterclockwise from the Fig. 9 to Fig. 10 positions to provide clearance for vise travel. Of course, any other suitable power or manually operated extensible link could be provided in place of the cylinder and piston unit 46 with the link at one end carried by the frame and the other end movable with element 31.

This actuating means for swinging at least guide element 31 from the Fig. 8 to 10 positions is activated or deactivated by the aforementioned suitable control means. It is deactivated during normal cut-off so that element 31 remains in the Fig. 8 position. It is activated prior to the end of rod 20 leaving coil 20a by actuating two power flow control elements in series in the power circuit for moving element 31 with these control elements here shown in Fig. 11 as operator actuated control member or button 92 and as cut-off head actuated control member or microswitch 108.

In the prior U.S. Patent No. 2,444,518, both guide elements had to be swung to the clearance position solely by the camming action of the vise movement with the structure for doing such shown in Figs. 10 and 11 thereof. This produced an axial buckling force applied to the rod during the pull-out operation when the feed rolls served as the sole drive for both rod and vise. Excessive pressure on the feed rolls bowed the wire. In the present disclosure, the elements are swung to their clearance position even before the vise is clamped on the end of the rod so that drag on the travel of the vise will be minimized and rod buckling will be minimized as the feed rolls 25 push the rod 20 forwardly and the right-hand end of the rod pushes the vise 80 along its way 81; only light feed roll pressure is required. The last end pulled through meets commercial straightness tolerances. Here, movement of the cut-off head 26 closes the microswitch 108 to energize the circuit for lowering the guide element 31, and the elements are swung to the clearance position independently of the travel movement of the vise 80.

This construction also serves as a means for holding both the elements 31 and 32 in the clearance position since element 31, in being forced in a counterclockwise direction by the fluid in cylinder 46, pushes element 32 downwardly against the tension of its return spring 44.

Alternate constructions readily suggest themselves. Microswitch 108, for example, may be closed by the travel of cut-off head 26 before cam 72 in Fig. 7 engages the roller 74, if so desired. Thus, the cylinder and piston unit 46 will swing both elements 31 and 32 simultaneously in a counterclockwise direction from Fig. 8 down to the clearance position shown in Fig. 10. Also, the rod cut to length and located in channel 30 will be discharged during this movement since the channel opens to permit rod discharge during the swing between the Fig. 8 and Fig. 10 positions. This action is caused by the different locations of the centers of shafts 35 and 36 and by the location of element 32 being in both the discharge and clearance positions of Figs. 9 and 10 on the same side of and below the closed position of Fig. 8.

As element 31 is swung to its clearance position in Fig. 10, gage bars 50 in Figs. 5 and 6 are also swung therewith.

It is desirable in order to drive the last length of rod 20 through the machine to provide a tighter grip by rolls 25 serving as the rod feeding means. Handle 25a in Fig. 1 may be swung from its upper to lower position to provide this tighter grip between rolls 24 in the same manner as disclosed in U.S. Patent No. 2,444,518 by moving handle 74 therein.

After the right end of the rod 20 has traveled through the cut-off head 26 during the advance of the rod length that will leave the reel 21, the vise 80, normally located in the clearance between cut-off head 26 and the guide elements 31 and 32 in Fig. 1, is clamped onto the end of the rod to be carried therewith to prevent rod end oscillation or rotation in the plane transverse of the rod. This vise 80 operates in exactly the same way as the vise disclosed in U.S. Patent No. 2,444,518 and is carried toward the right in Fig. 1 by the moving rod in the same manner. The vise 80 is clamped upon the rod by having the operator swing the handle 120 counterclockwise from Figs. 3 to 4 positions to push the movable jaw 121 toward the right to wedge the rod 20 against the stationary jaw 122. Since the rod 20 is moving rapidly, handle 120 must be operated to clamp onto the rod as it moves; the operator does this easily by allowing his hand to travel with the handle 120 aas he moves it from the unclamping to clamping positions in Figs. 3 and 4 respectively. With rod 20 firmly clamped, as shown in Fig. 4, it is impossible for the last length of rod 20 to be twisted in any way as it runs out for cutting because the rod is firmly gripped between the jaws 121 and 122; the vise itself can move only in one direction, namely lengthwise along the way 81 in the direction toward the right in Fig. 1 as the feed rolls 25 drive the rod 20 and vise 80 toward the right.

When elements 31 and 32 are swung to the Fig. 10 position for pull-out operation, support means for rod 20 in Fig. 10 are provided on the machine for supporting any rod sag between the feeding rolls 25 or cut-off head 26 and vise 80. This takes the form in the present invention of one or more members 125 in Fig. 10 secured to the top surface of element 31 and movable therewith. Each member 125 extends generally horizontally in the clearance position in Fig. 10 to support the rod 20 before cut-off but to permit rod roll-off after cut-off. This is a very good location for having rod support member 125 since it is normally up out of the way while the elements are being used for rod guide in their closed position in Fig. 8 but it is moved down to the rod support position as the elements move downwardly to a clearance position below the path of vise travel. After the rod has been fed out to proper length or at least just before the scrap end of the rod starts to go through the cut-off head, the cut-off blade is actuated in any suitable manner to cut the rod free from its left end. Also, the jaws are released in vise 80 after cut-off to release the cut rod therefrom.

After a new coil of wire 20a is put into the machine, the machine may be reset by swinging the guide elements backwardly from the Fig. 10 to Fig. 8 positions. Also, the vise 80 is moved toward the left in Fig. 1 back to its clearance position between cut-off head 26 and guide elements 31 and 32.

The elements are reset by depressing button 104 in Fig. 11. This breaks the holding circuit previously mentioned by breaking the connection between lines 102 and 105 so as to deenergize relay coil R and then deenergize solenoid 111a of valve 111. Also, a circuit is formed to lower the piston rod 46a so as to swing the elements back to their Fig. 8 position. This circuit is from power line L1 through line 94, switch contact 90a, switch member 90, line 128, switch contacts 104a (now closed by push button 104 being pushed toward the right), line 129, valve actuating solenoid 111b, line 112 and line 99 to power line L2. This solenoid 111b reciprocates the stem of valve 111 in the opposite direction so that fluid under pressure entering conduit 114 in Fig. 2 travels through valve 111, and conduit 116 to the upper end of the cylinder to move the piston rod 46a and the piston thereon downwardly so as to swing the guide elements 31 and 32 in a clockwise direction from the Fig. 10 to the Fig. 8 position. The fluid in the lower end of the piston and cylinder unit 46 is exhausted through conduit 115, valve 111 and exhaust conduit 117.

Various changes in details and arrangement of parts can be made by one skilled in the art without departing from either the spirit of this invention or the scope of the appended claims.

What I claim is:

1. In a straighten-and-cut machine having a zone wherein a length of rod from a coil is run out and cut to length and wherein guide elements normally hold said rod in proper gaging and cutting position in said zone, rod feeding means for causing movement of said rod, a first guide element having in a rod discharge position a generally downwardly directed rod receiving channel with an open lower side sufficiently large to permit rod ejection therethrough, a second element, means operatively associating said elements together for covering said open side with said second element in a channel closed position in said zone for preventing rod discharge from said channel by gravity or for uncovering said channel in a discharge position to permit discharge, a vise located a spaced distance in the direction of motion of the rod from said feeding means and adapted to be clamped on said rod and carried with the rod movement in said zone for supporting said rod independently of said guide elements, means preventing rotation of said vise transversely of said rod, means for moving said second element from said closed position to said discharge position after rod cut-off to length so that the cut-off rod will discharge through said open side by gravity, element moving means operatively associated with both of said elements for moving both of said elements to a clearance position out of the path of vise travel to permit vise travel in said zone, and normally ineffective control means operatively connected to said element moving means and responsive to cut-off head movement and selectively operated means actuated prior to the end of said rod leaving the coil and prior to said vise and rod being moved in the portion of said zone occupied by said elements in closed position for permitting energization of said element moving means by said cut-off head movement for moving both elements to said clearance position.

2. In a straighten-and-cut machine having a zone wherein a length of rod from a coil is run out and cut to length and wherein guide elements normally hold said rod in proper gaging and cutting position in said zone, a relatively heavy one of said guide elements having in a rod discharge position a generally downwardly directed rod receiving channel with an open lower side sufficiently large to permit rod ejection therethrough by gravity, said relatively heavy element normally remaining in said discharge position, a second said element being relatively light, means on said machine operatively connecting said one and second elements together with said second element normally covering said open side in a channel closed position in said zone for preventing rod discharge from said channel by gravity, a vise adapted to be clamped on said rod and moved therewith in said zone, means preventing rotation of said vise transversely of said rod, means connected to said second element for moving only said second element from said closed position to said discharge position wherein said second element is located on one side of a plane bisecting the open side of said channel plus at least one-half of the cross sectional dimension of said rod for uncovering said open lower side after rod cut-off to length and permitting discharge of said cut-off rod through said open side by gravity when moved to a channel opening position so that the inertia of element movement is minimized and rod discharge clearance between said elements is large because only said second element is moved between said positions, and means operatively connecting said one and second elements on said machine for moving both of said elements near the end of coil feed-out to a clearance position out of the path of vise travel to permit vise travel in said zone.

3. In a machine, as set forth in claim 2, with the first recited means including resilient means operatively connected to said one and second elements to urge said second element into contact with said one element in said channel closed position, to resist the movement of said second element by the third recited means to said discharge position, and to urge said second element against said one element during movement to said clearance position by the fourth recited means.

4. In a machine, as set forth in claim 2, with the first, third and fourth recited means including two laterally spaced apart parallel shafts mounted for oscillation on the machine, two arms with one rigidly connecting each said element and an associated one of said shafts for positioning said elements on said machine with said second element normally covering said open side and thereby defining said channel closed position in said zone for preventing rod discharge from said channel by gravity.

5. In a straighten-and-cut machine having a zone wherein a length of rod from a coil is run out and cut to length and wherein a pair of guide elements normally holds said rod in proper gaging and cutting position in said zone, the combination of a frame, rod feeding means for feeding said rod to said zone, a first guide element of said pair being relatively heavy and having in a rod discharge position a generally downwardly directed rod receiving channel with an open lower side sufficiently large to permit rod ejection therethrough, said relatively heavy element normally remaining in said discharge position, a second element of said pair being relatively light, two laterally spaced apart parallel shafts mounted for oscillation on said frame, two arms with one rigidly connecting each said element and an associated one of said shafts for positioning said elements on said frame with said second element of said pair normally covering said open side and thereby defining a channel closed position in said zone for preventing rod discharge from said channel by gravity, a vise located a spaced distance in the direction of motion from said feeding means and adapted to be clamped onto the leading portion of said rod near the end of the feed-out operation and carried by feed of said end into and through said zone, a cut-off head located between said feeding means and both said vise and elements and reciprocable in a path along the length of rod movement, means preventing rotation of said vise transversely of said rod, resilient means urging at least one of said elements in one direction into channel closed position with respect to the other, means responsive to cut-off head movement for turning said second element and its shaft relative to the first element in a direction opposite to said one direction from said closed position to said discharge position wherein said second element is located on one side of a plane bisecting the open side of said channel plus at least one-half of the cross sectional dimension of said rod so that the inertia of element movement is minimized and rod discharge clearance between said elements is large because only said second element is moved between said positions against the bias of said resilient means after rod cut-off to length so that the cut-off rod will discharge through said open side by gravity, element moving means operatively associated with and responsive to cut-off head movement and operable independently of the travel movement of said vise for turning the other of said elements in said opposite direction prior to carrying of the vise by the rod in the portion of the zone occupied by the elements in closed position and near the end of coil feed-out to a clearance position below and out of the path of vise travel to permit vise travel in said zone and with said channel open to permit rod discharge and for holding said elements in said clearance position with said other element pushing against said one element, said discharge and clearance positions both being on the same side of and below said closed position, rod support means on one of said elements for supporting any rod sag between said feeding means and vise, said rod support means including a member carried by said last mentioned element and horizontally extending in said clearance position to support said rod before cut-off but to permit rod roll-off after cut-off, said element moving means including a power operated extensible link with one end carried by the frame and the other end movable with said other element, and control means for deactivating said element moving means during normal cut-off or activating said element moving means in response to cut-off head movement prior to the end of said rod leaving the coil.

References Cited in the file of this patent
UNITED STATES PATENTS

| | | |
|---|---|---|
| 2,101,860 | Lewis et al. | Dec. 14, 1937 |
| 2,444,518 | Lewis | July 6, 1948 |
| 2,625,195 | Tremblay | Jan. 13, 1953 |